(12) United States Patent
Cook et al.

(10) Patent No.: US 8,421,267 B2
(45) Date of Patent: Apr. 16, 2013

(54) PACKAGING AND DETAILS OF A WIRELESS POWER DEVICE

(75) Inventors: Nigel P. Cook, El Cajon, CA (US); Lukas Sieber, Olten (CH); Hanspeter Widmer, Wohlenschwil (CH)

(73) Assignee: QUALCOMM, Incorporated, San Diego, CA (US)

( * ) Notice: Subject to any disclaimer, the term of this patent is extended or adjusted under 35 U.S.C. 154(b) by 127 days.

(21) Appl. No.: 12/400,703

(22) Filed: Mar. 9, 2009

(65) Prior Publication Data

US 2009/0224609 A1 Sep. 10, 2009

Related U.S. Application Data

(60) Provisional application No. 61/035,340, filed on Mar. 10, 2008.

(51) Int. Cl.
 *H02J 1/10* (2006.01)
(52) U.S. Cl.
 USPC .................................................... 307/20
(58) Field of Classification Search .............. 307/20
 See application file for complete search history.

(56) References Cited

U.S. PATENT DOCUMENTS

| | | | |
|---|---|---|---|
| 5,301,358 A * | 4/1994 | Gaskill et al. ............ | 455/193.2 |
| 5,929,598 A | 7/1999 | Nakama et al. | |
| 6,028,413 A | 2/2000 | Brockmann | |
| 6,972,543 B1 | 12/2005 | Wells | |
| 7,385,357 B2 | 6/2008 | Kuennen et al. | |
| 7,741,734 B2 | 6/2010 | Joannopoulos et al. | |
| 7,825,543 B2 | 11/2010 | Karalis et al. | |
| 2003/0015479 A1 | 1/2003 | Kuennen et al. | |
| 2004/0130916 A1* | 7/2004 | Baarman .................. | 363/21.02 |
| 2005/0127867 A1 | 6/2005 | Calhoon et al. ............ | 320/108 |
| 2005/0131495 A1 | 6/2005 | Parramon et al. ............ | 607/61 |
| 2007/0171681 A1 | 7/2007 | Baarman | |
| 2007/0222542 A1 | 9/2007 | Joannopolous | |
| 2008/0191897 A1 | 8/2008 | McCollough ............ | 340/625.22 |
| 2009/0212636 A1 | 8/2009 | Cook et al. | |
| 2009/0284245 A1 | 11/2009 | Kirby et al. | |
| 2010/0165667 A1* | 7/2010 | Artusi et al. ............... | 363/21.01 |
| 2010/0327661 A1* | 12/2010 | Karalis et al. .............. | 307/104 |

OTHER PUBLICATIONS

"Wireless Non-Radiative Energy Transfer", MIT paper, publication and date unknown, believed to be 2007.
"Efficient wireless non-radiative mid-range energy transfer", MITpaper, publication and date unknown, believed to be 2007.
"Wireless Power Transfer via Strongly Coupled Magnetic Resonances", Kurs et al, Science Express, Jun. 7, 2007.
"Wireless Power Transfer via Strongly Coupled Magnetic Resonances", Kurs et al, scimag.org, Jul. 6, 2007.

* cited by examiner

*Primary Examiner* — Robert L. Deberadinis
(74) *Attorney, Agent, or Firm* — Knobbe Martens Olson & Bear, LLP

(57) ABSTRACT

A wireless power system includes a power source, power receiver, and components thereof. A current sensor senses the amount of current through the antenna. That amount of current is then used to adjust characteristics of the transmitting or receiving.

53 Claims, 4 Drawing Sheets

PACKAGING AND DETAILS OF A WIRELESS POWER DEVICE

This application claims priority from provisional application No. 61/035,340, filed Mar. 10, 2008, the entire contents of which are herewith incorporated by reference.

BACKGROUND

Our previous applications and provisional applications, including, but not limited to, U.S. patent application Ser. No. 12/018,069, filed Jan. 22, 2008, entitled "Wireless Apparatus and Methods", and U.S. patent application Ser. No. 12/398,179, filed Mar. 4, 2009 entitled "Packaging and Details of a Wireless power device", the disclosures of which is herewith incorporated by reference, describe wireless transfer of power.

The transmit and receiving antennas are preferably resonant antennas, which are substantially resonant, e.g., within 10% of resonance, 15% of resonance, or 20% of resonance. The antenna is preferably of a small size to allow it to fit into a mobile, handheld device where the available space for the antenna may be limited. An embodiment describes a high efficiency antenna for the specific characteristics and environment for the power being transmitted and received.

One embodiment uses an efficient power transfer between two antennas by storing energy in the near field of the transmitting antenna, rather than sending the energy into free space in the form of a travelling electromagnetic wave. This embodiment increases the quality factor (Q) of the antennas. This can reduce radiation resistance ($R_r$) and loss resistance ($R_l$).

Our previous disclosures described different ways in which this can be done.

There are a number of different reasons why one might want to use wireless power for portable items. Wireless power avoids the tangle and clutter of wires. It also can allow the automatic recharge of a rechargeable system. Computer systems have used wireless keyboards and mice, to avoid the clutter of wires on a user's desk. However, users still need to occasionally change the batteries in such devices. The changing of batteries can be disruptive, and inconvenient.

SUMMARY

The present application describes aspects of a wireless desktop system. According to an embodiment, wireless power is integrated into elements on a user desktop such as a keyboard, mouse, speakers, and other similar components.

DETAILED DESCRIPTION

Our previous patent applications including U.S. patent application Ser. No. 12/351,845 filed Jan. 11, 2009; and U.S. patent application Ser. No. 12/353,851, describe use of wireless power to form a wireless desktop that allows attaching a wireless keyboard, mouse, or other peripherals. These previous applications have disclosed how a wireless desktop has advantages for wireless power.

These applications match the opportunities of vicinity coupling for wireless power technology. Proximity coupling and charging pad solutions have been known for using wireless power. However, these have the disadvantage of requiring that the materials be placed directly in the right spot.

Another advantage of wireless power on the desktop is that many parts already exist on the desktop which have the right form factor for transmission of wireless power, including, but not limited to, the mouse station, and the base for a display.

Figure 1:
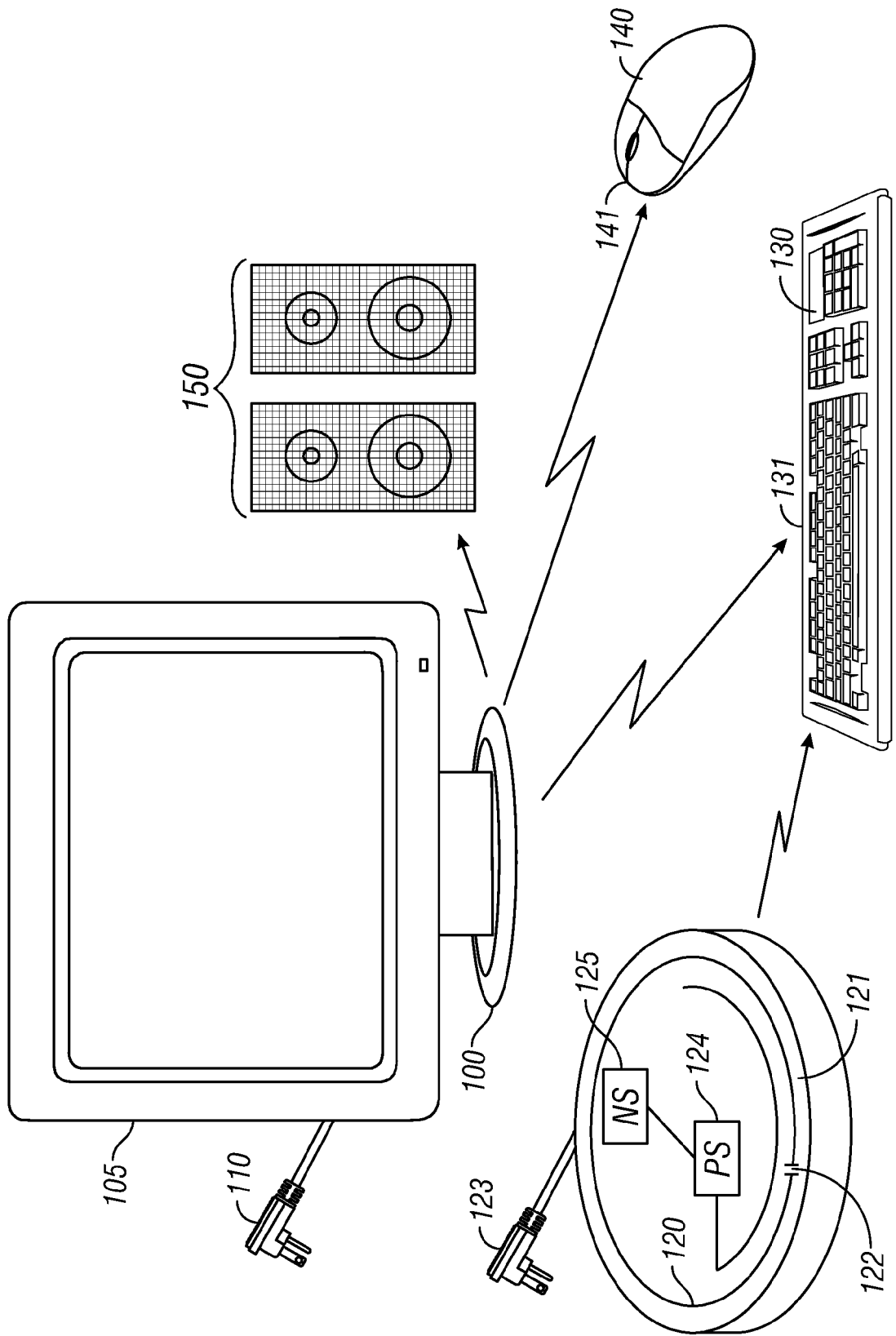
FIG. 1 shows an embodiment of a wireless power system.

FIG. 1 shows an embodiment of a wireless power system in which a power base 100 is integrated into the base of a display 105. The display receives its power through an electrical socket shown as 110. That electrical power is also used to transmit wireless power from the base. The base is preferably in a circular form to hold the monitor. The circular form houses a circular loop coil. The size of the base is large enough so that a sufficiently large coil diameter can be used. As an alternative, or in addition to the power in the base, there can be a discrete power connection shown as 120. Either or both of these systems can wirelessly transmit power. The power is transmitted to a corresponding receiver and a number of different items. For example, a wireless keyboard 130 includes a wireless receiver 131. The wireless mouse 140 includes a corresponding receiver 141. Wireless speakers shown as 150 may also correspondingly include wireless power.

In different embodiments, the system can use a high frequency band of 13.56 MHz for transmission of power, or a low frequency band around 135 kHz.

The base, either the base of the PC screen or the discrete power base, each include a coil shown as 121 in parallel with a high voltage capacitor. The coil is connected to receive power from a power supply system that is powered by the AC power cord 123. The power supply system also drives auxiliary structure including an antenna current sense circuit shown as 125.

Figure 2:
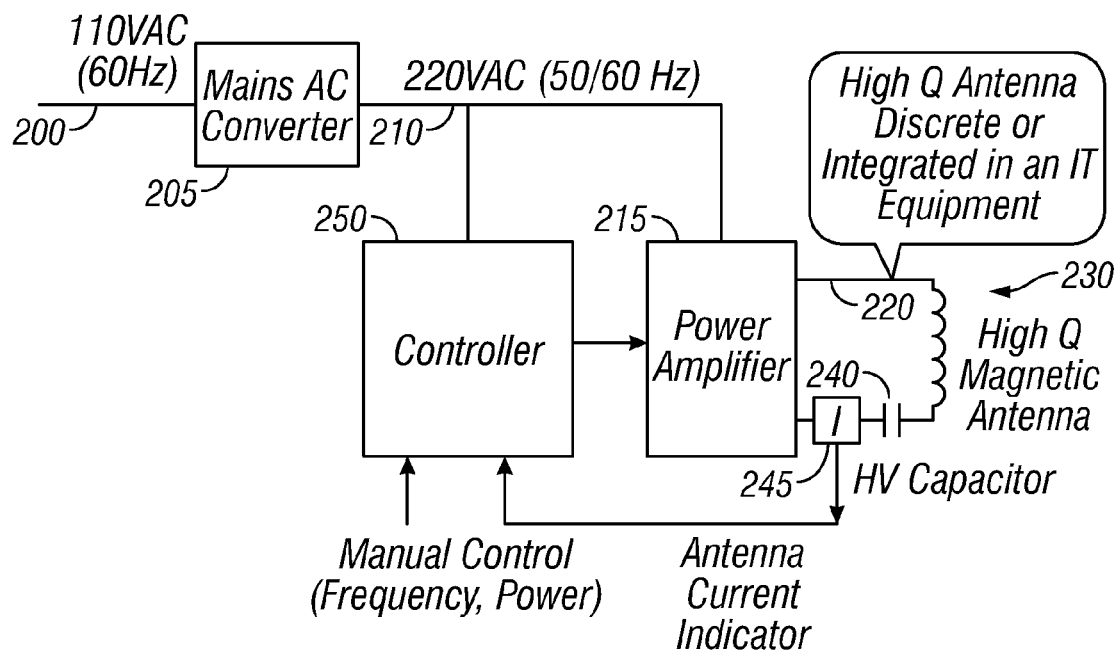
FIG. 2 shows a block diagram of a wireless power transmit circuit.

FIG. 2 illustrates a block diagram of a wireless power transmit circuit which can be formed in either the power base 100 or the discrete power base 120. AC power 200 is converted by a converter 205 e.g. a transformer or switched power supply, to another voltage level. The voltage level 210 is then used to create a signal in a power amplifier 215. The power amplifier 215 produces an output 220 at a frequency which is resonant with the resonant value of the antenna 230. The antenna 230 can include an inductor 235, and a high-voltage capacitor 240. The current flowing through the antenna 230 is sensed by a current sensor 245. The amount of current will depend on coupling of the load, decoupling by external items, or others. The sensed amount of current can be returned to the controller 250. The controller 250 can control parameters of the power amplifier 215, including changing its frequency and changing the amount of power it transmits. The control can be based, at least in part, on the sensed current sensed by the current indicator 245. A signal indicative of the sensed current is used by said transmit system to change the driving signal to the magnetically resonant antenna, based on an external characteristic of the medium into which transmission occurs. For example, this may be based on the number of interfering elements close to the phone, or based on the amount of loading by said magnetically resonant antenna. The characteristics of the way that the current changes when other detuning items are close and/or when multiple items are loading the device may be monitored and used to create a table or ruleset. That ruleset can then be used to set the way that the controller reacts to items being close.

The ruleset can be created by experimentation for any specific circuit and configuration.

Figure 3:
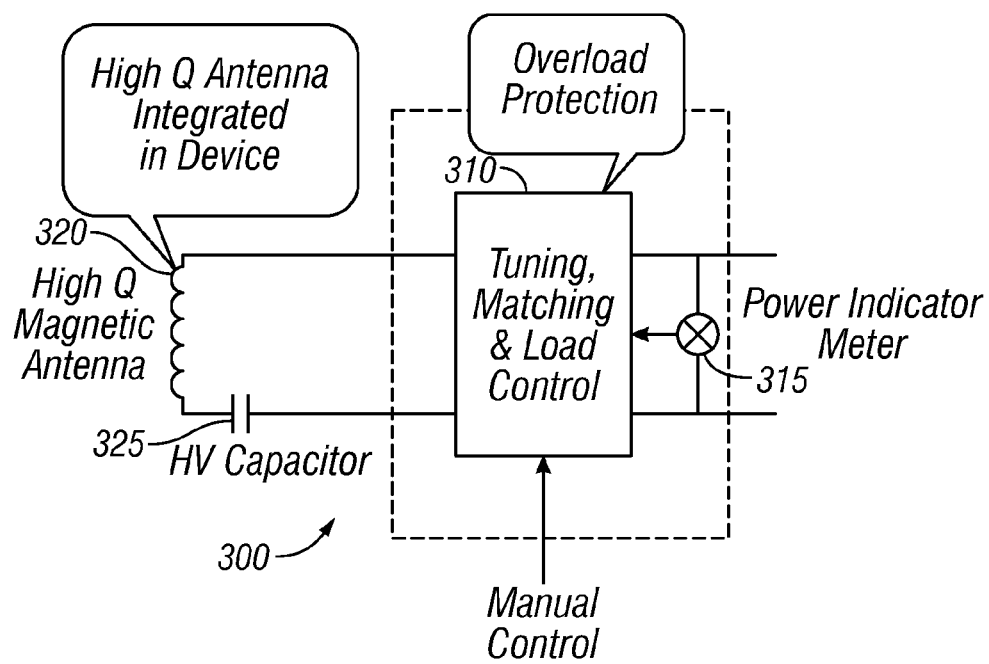
FIG. 3 shows a block diagram of an antenna system.

Another embodiment of the antenna system is shown in block diagram form in FIG. 3. The antenna 300 includes a tuning, matching and load control assembly 310 that carries out tuning, matching and also carries out load control. The tuning and matching can include one or both of switching in an additional capacitance and/or inductance; or removing some capacitance and/or inductance to better match the frequency the resonant frequency of the loaded antenna to the driving frequency. This may be done based on a detection that the dielectric objects are close enough to detune the antenna. As in the first embodiment, the antenna includes a coil 320 in series with a high-voltage capacitor 325. The tuning and matching may also be responsive to a power indicator meter 315.

Figure 4:
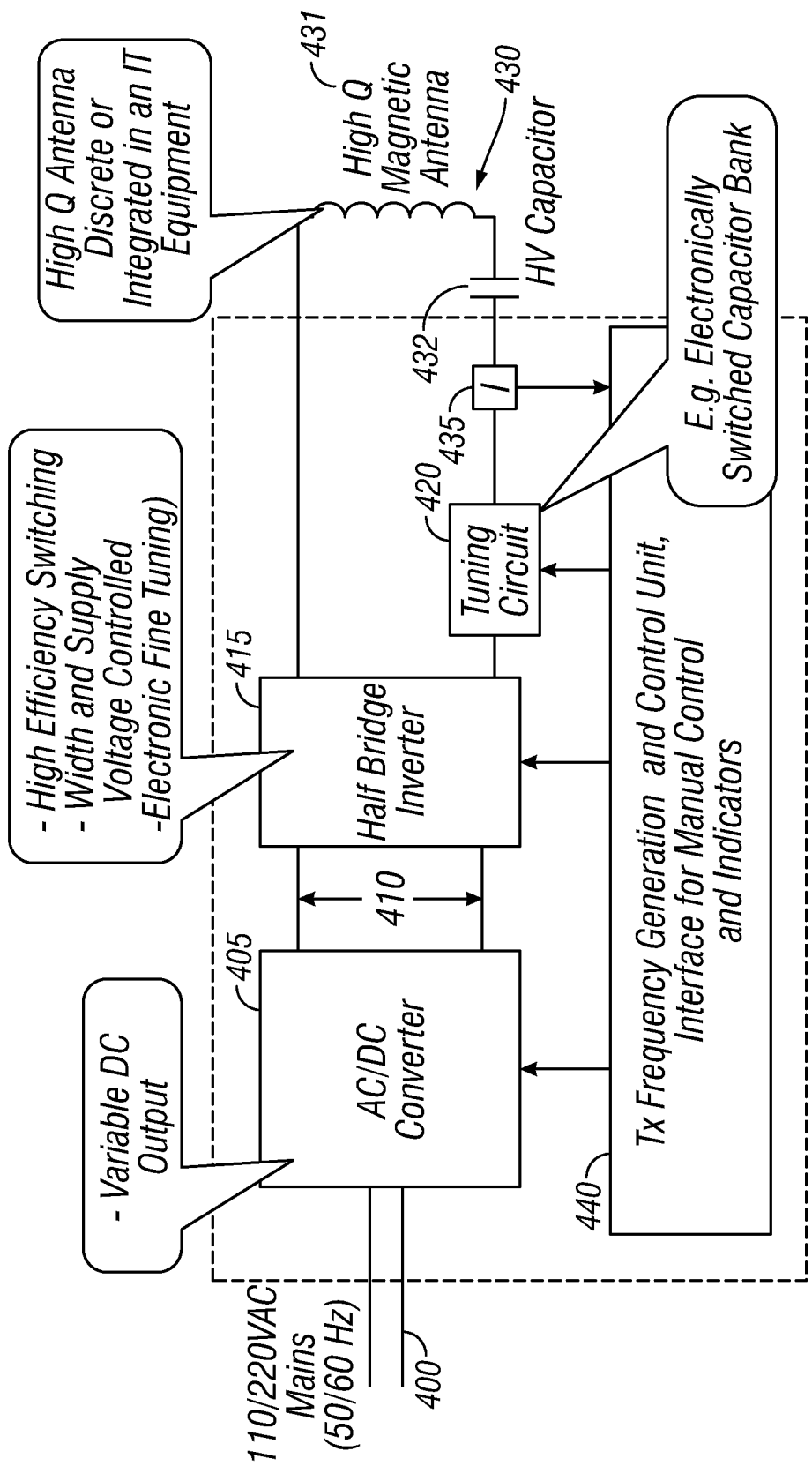
FIG. 4 shows a block diagram of a wireless power system with additional component parts.

Another embodiment may add additional components into the power base. The additional components may include the parts as shown in FIG. 4. The input AC power 400 is input to an AC to DC converter 405 that can produce a variable DC output at 410. A half bridge inverter 415 can be controllable in various ways, including pulse width and supply voltage controlled electronic fine-tuning. By changing the characteristics of the inverter, matching to the antenna can be improved. The matching can also be carried out using a tuning circuit 420. As in the above embodiments, the antenna 430 includes a coil 431 in series with a high-voltage capacitor 432. The current through the antenna is also sensed by a current sensor 435. A control unit 440 creates frequencies and interfaces, to control the AC to DC converter, half bridge inverter 415, and tuning circuit. In one embodiment, the antenna 430 may use the antenna of FIG. 3 that has overload protection built in. The overload protection may operate based on the current flow from current sensor 435. In an embodiment, the components in the device may be sized for specific levels of reactive and other voltage and current. For example, the capacitor(s) in the antenna can have a specified voltage rating. These levels, especially the level of reactive voltage, can become very high during the power generation and reception. In an embodiment, the overload protection can sense these levels and prevent the levels from exceeding the rated levels by more than a specified amount.

Figure 5:
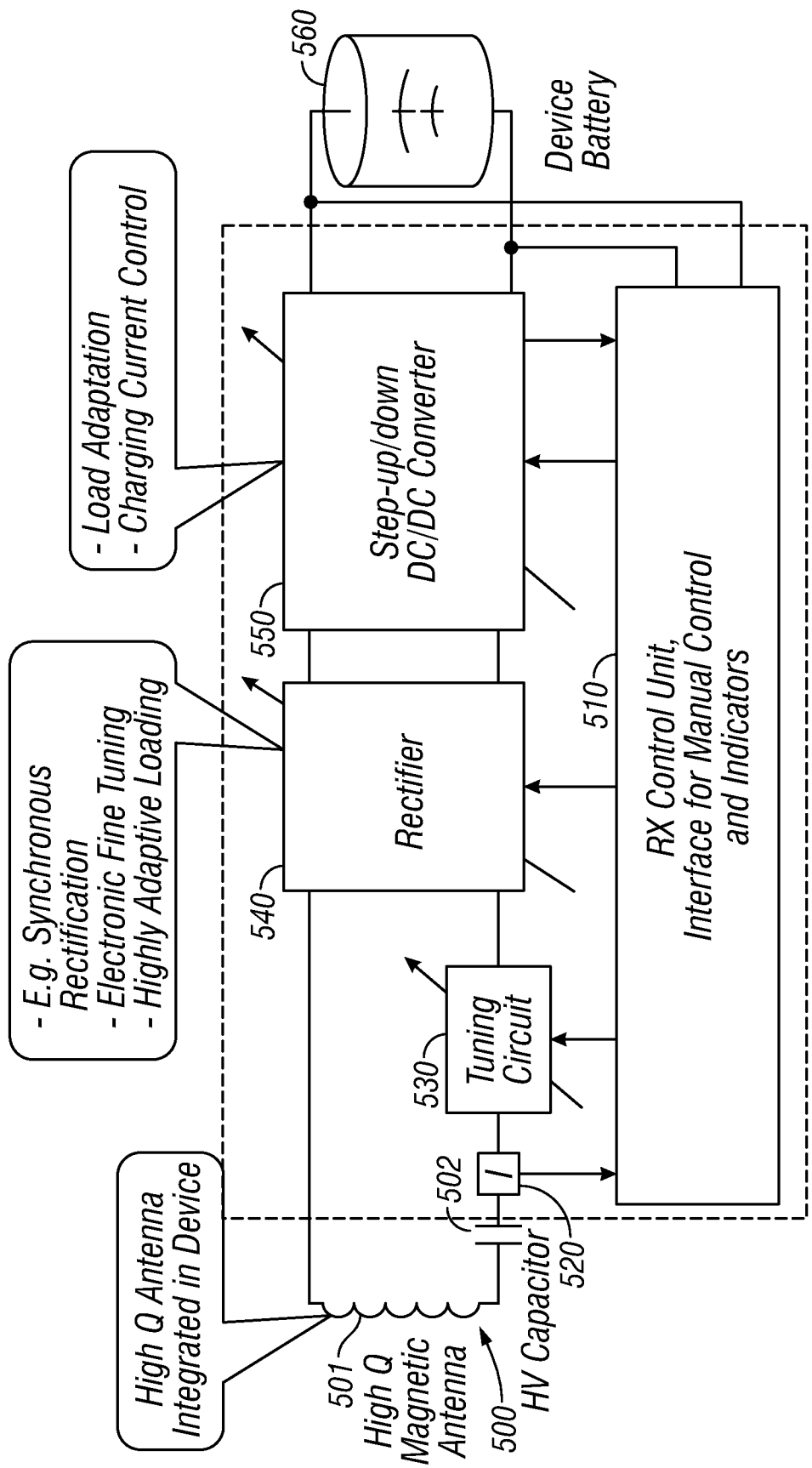
FIG. 5 shows a block diagram of the receiver device.

FIG. 5 shows a block diagram of the receiver device. A magnetic field induced by a transmitter, e.g. the transmitter 430, is received into the receiving antenna 500. As in other embodiments, the antenna can be formed of a coil 501 in series with a capacitor 502. A receive control unit 510 is powered by the received power and also may have a rechargeable battery that is charged by the power, to allow operation when the received power, and changes characteristics to improve the coupling and to optimize either or both of efficiency and/or power that is received.

Received current 520 is sensed, and a signal indicative thereof is sent to the control unit 510. The control unit correspondingly controls a tuning unit 530, rectifier 540, and a DC to DC converter 550. The rectifier carries out synchronous rectification, with an adaptive load. This can avoid the diode voltage drop that would otherwise occur across a conventional diode rectifier. In a synchronous-rectifier, an electronic switch such as a MOSFET forms a half-bridge configuration that clamps the switching node to −0.1V or less. The synchronous rectifier improves the efficiency by placing a low-resistance conduction path across the diode rectifier.

A load formed by the antenna can be changed by the control unit in order to improve the matching based on characteristics sensed by the control unit. For example, this can change capacitance and/ or inductance. The controller can also change the characteristics of the rectifier, e.g, the frequency of the synchronous rectification, or the characteristics of the adaptive load presented by the rectifier.

Similarly, the DC to DC converter 550 can carry out load adaptation based on specific sensed characteristics. Both the rectifier and the DC to DC converter 550 are controlled by the control unit 510.

The DC to DC converter also carries out charging current control to the device battery, 560, to avoid overcharging that battery or charging it too aggressively.

One important aspect of this system is the adaptive control. For example, because the current through the antennas is sensed, the operation can allow more aggressive control of the battery charging during low power times than during high-powered times. For example, if the receiver is receiving low amounts of current, then rectifier more aggressively steps up the power. This causes the DC to DC converter to step up the power to a sufficiently high voltage to drive the battery. Sensing the current through the antenna can be used to control the different items in the circuit and to determine how these different items should operate.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of antennas can be used. Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A wireless power transmitter, comprising:
   a magnetically resonant antenna configured to receive a driving signal causing a current to flow through the magnetically resonant antenna;
   a transmit circuit configured to generate the driving signal at a frequency that is substantially equal to a resonant frequency of the magnetically resonant antenna; and
   a current sensor configured to sense an amount of the current and generate a current sense signal indicative of a degree of coupling or decoupling by the magnetically resonant antenna, the transmit circuit being configured to change the driving signal based on the current sense signal.

2. A transmitter as in claim 1, wherein the antenna is tuned to 13.56 Mhz or 135 KHz.

3. The transmitter as in claim 1, wherein the transmit circuit comprises an inverter configured to generate the driving signal at the frequency.

4. The transmitter as in claim 3, wherein the controller controls operating characteristics of the inverter.

5. The transmitter as in claim 4, wherein the controller controls pulse width and electronic tuning of the inverter.

6. The transmitter as in claim 1, wherein the magnetically resonant antenna comprises at least one component with a specified voltage and/or current rating, and wherein the transmit circuit further comprises an overload protection part, responsive to the amount of current, that prevents voltages and/or currents higher than a predetermined level based on the specified voltage and/or current rating.

7. The wireless power transmitter as in claim 1, wherein the transmit circuit is configured to change the driving signal by at least one of adjusting an amount of power provided by the driving signal or adjusting the frequency of the driving signal.

8. The wireless power transmitter as in claim 1, wherein the transmit circuit comprises at least one of an AC to DC converter, a half bridge inverter, or a tuning circuit, and wherein the transmit circuit is configured to change the driving signal by controlling operating characteristics of at least one of the AC to DC converter, the half bridge, inverter, or the tuning circuit.

9. The wireless power transmitter as in claim 1, wherein the magnetically resonant antenna is configured to wirelessly provide power to a receiver device to power or charge a load based on the driving signal.

10. The wireless power transmitter as in claim 1, wherein the current sensor is configured to sense an amount of the current by sensing a magnitude of the current.

11. A wireless power receiver, comprising:
a magnetically resonant antenna configured to wirelessly receive a signal causing a current to flow through the magnetically resonant antenna;
a receive circuit configured to receive the signal at a frequency that is substantially equal to a resonant frequency of the magnetically resonant antenna, the receive circuit being further configured to generate electrical power from the signal at a level sufficient to power or charge a load; and
a current sensor configured to sense an amount of the current and configured to generate a current sense signal indicative thereof, the receive circuit being configured to change a reception characteristic based on the current sense signal from the current sensor.

12. The receiver as in claim 11, wherein the antenna is tuned to 13.56 MHz or 135 KHz.

13. The receiver as in claim 11, wherein the receive circuit comprises a controller configured to monitor the signal from the current sensor and configured to change the reception characteristic.

14. The receiver as in claim 13, wherein the receive circuit further comprises a rectifier configured to rectify the signal to generate the electrical power, the rectifier being controlled by the controller.

15. The wireless power receiver of claim 13, further comprising a tuning circuit, and wherein the controller is configured to change the reception characteristic by controlling the tuning circuit.

16. The receiver as in claim 14, wherein the rectifier is a synchronous rectifier, and the controller is configured to control a frequency of the synchronous rectifier.

17. The receiver as in claim 14, wherein the rectifier is a synchronous rectifier, and the controller is configured to control characteristics of an adaptive load presented by the rectifier.

18. The receiver as in claim 11, further comprising an overload protection part, responsive to the amount of current, the overload protection part being configured to prevent currents higher than a predetermined level based on ratings of electronic components of the receiver.

19. The receiver as in claim 18, wherein the ratings are ratings of components forming the antenna.

20. The wireless power receiver of claim 11, wherein the reception characteristic comprises at least one of a capacitance or an inductance of the magnetically resonant antenna, an operating characteristic of a rectifier circuit, or an operating characteristic of an adaptive load presented by the rectifier circuit.

21. The wireless power receiver of claim 11, wherein the receive circuit is configured to change a reception characteristic by increasing an amount of power provided by a rectifier circuit in response to the current sense signal indicating that the current is below a threshold.

22. A method for controlling wireless power reception, comprising:
receiving a wireless magnetic signal at an antenna causing a current to flow through the antenna, the antenna being configured to be tuned to a resonant frequency at a first frequency;
converting the wireless magnetic signal to electric power at a level sufficient to power or charge a load using electrical circuitry connected to the antenna;
sensing an amount of the current;
generating a current sense signal indicative thereof; and
changing a characteristic of the electrical circuitry to improve an interface with a source of the wireless magnetic signal based on the current sense signal.

23. The method as in claim 22, wherein the antenna is tuned to 13.56 MHz or 135 KHz.

24. The method as in claim 22, wherein the antenna includes at least one component with a specified voltage and/or current rating and wherein changing a characteristic of the electrical circuitry to prevent currents and/or voltages higher than a predetermined level based on ratings of the at least one component.

25. The method as in claim 22, wherein the source of the wireless magnetic signal comprises a wireless power transmitter.

26. The method as in claim 22, wherein the electrical circuitry comprises a rectifier, and wherein changing the characteristic of the electrical circuitry comprises controlling characteristics of the rectifier.

27. The method as in claim 26, wherein the rectifier is a synchronous rectifier, and wherein controlling characteristics of the rectifier comprises controlling a frequency of the synchronous rectifier.

28. The method as in claim 26, wherein the rectifier is a synchronous rectifier, and wherein controlling characteristics of the rectifier comprises controlling characteristics of an adaptive load presented by the rectifier.

29. The method as in claim 26, wherein controlling characteristics of the rectifier comprises increasing an amount of power provided by the rectifier in response to the current sense signal indicating that the current is below a threshold.

30. The method as in claim 22, wherein the electrical circuitry comprises a DC to DC converter, and wherein changing a characteristic of the electrical circuitry comprises controlling characteristics of the DC to DC converter.

31. A method for controlling wireless power transmission, comprising
converting electrical power to a driving signal at a first frequency using electrical circuitry;

driving an antenna with the driving signal to wirelessly transmit a magnetic signal via an antenna which is tuned to have a resonant frequency at substantially the first frequency;

sensing an amount of current that flows through the antenna;

generating a current sense signal indicative of a degree of coupling or decoupling of the antenna; and changing a characteristic of the electrical circuitry to adjust a driving signal based on the current sense signal.

32. The method as in claim 31, wherein the antenna is tuned to 13.56 MHz or 135 KHz.

33. The method as in claim 31, wherein changing a characteristic of the electrical circuitry to adjust the driving signal comprises at least one of adjusting an amount of power provided by the driving signal or adjusting the frequency of the driving signal.

34. The method as in claim 31, wherein changing a characteristic of the electrical circuitry to adjust the driving signal comprises controlling operating characteristics of at least one of an AC to DC converter, a half bridge, inverter, or a tuning circuit.

35. The method as in claim 31, wherein wirelessly transmitting the magnetic signal via the antenna comprises wirelessly providing power to a receiver device to power or charge a load.

36. The method as in claim 31, wherein the antenna includes at least one component with a specified voltage and/or current rating, the method further comprising preventing currents and/or voltages higher than a predetermined level based on ratings of the at least one component and based on the current sense signal.

37. A wireless power receiver, comprising
a magnetically resonant antenna; and
a receive circuit configured to receive a signal at a frequency that is substantially equal to a resonant frequency of the magnetically resonant antenna, the receive circuit being further configured to generate electrical power from the signal at a level sufficient to power or charge a load, the receive circuit including a control unit configured to change a characteristic of electrical power to improve matching with the magnetically resonant antenna, the receive circuit comprising a synchronous rectifier.

38. The receiver as in claim 37, wherein the receive circuit is configured to change a frequency of the synchronous rectifier to improve the matching.

39. The receiver as in claim 37, wherein the receive circuit includes a DC to DC converter.

40. The receiver as in claim 39, wherein the receive circuit is configured to change a characteristic of the DC to DC converter to improve the matching.

41. The receiver as in claim 39, further comprising a current sensor configured to sense an amount of current that flows through the magnetically resonant antenna and being configured to create a signal indicative thereof.

42. The receiver as in claim 37, wherein the antenna is tuned to 13.56 MHz or 135 KHz.

43. A wireless power receiver, comprising:
means for receiving a wireless magnetic signal at an antenna, the antenna having a resonant frequency and being configured to be tunable to the resonant frequency;
means for converting the wireless magnetic signal into electric power, the signal being at a level sufficient to charge or power a load;
means for sensing an amount of current flowing through the means for receiving the wireless magnetic signal;
means for generating a current sense signal indicative of the amount of current flowing; and
means for changing a characteristic of the means for converting the wireless magnetic signal to improve an interface with a source of the wireless magnetic signal based on the current sense signal.

44. The wireless power receiver as in claim 43, wherein the characteristic comprises a capacitance or an inductance of the means for receiving the wireless magnetic signal, an operating characteristic of a rectifier circuit, or an operating characteristic of an adaptive load presented by the rectifier circuit.

45. The wireless power receiver as in claim 43, wherein means for changing the characteristic comprises means for increasing an amount of power provided by a rectifier circuit in response to the current sense signal indicating that the current is below a threshold.

46. A wireless power transmitter, comprising means for wirelessly transmitting power at a level sufficient to charge or power a load of a receiver device, the means for wirelessly transmitting power having a resonant frequency;
means for generating a driving signal at a frequency that is substantially equal to the resonant frequency;
means for sensing an amount of current that flows through the means for wirelessly transmitting power;
means for generating a current sense signal indicative of a degree of coupling or decoupling of the means for wirelessly transmitting power; and
means for changing the driving signal based on the current sense signal.

47. The wireless power transmitter as in claim 46, further comprising means for changing the driving signal based on the current sense signal by adjusting an amount of power provided by the driving signal or adjusting the frequency of the driving signal.

48. A method for receiving wireless power, comprising:
receiving a signal from a magnetically resonant antenna at a receive circuit at a frequency that is substantially equal to a resonant frequency of the magnetically resonant antenna, the receive circuit comprising a synchronous rectifier;
generating electrical power from the signal at a level sufficient to power or charge a load; and
changing a characteristic of electrical power to improve matching with the magnetically resonant antenna.

49. The method as in claim 48, wherein changing the characteristics comprises changing a frequency of the synchronous rectifier to improve the matching.

50. The method as in claim 48, further comprising sensing an amount of current that flows through the magnetically resonant antenna and changing the characteristic based on the amount of current.

51. A wireless power receiver, comprising:
means for receiving a signal at a frequency that is substantially equal to a resonant frequency of a magnetically resonant antenna;
means for generating electrical power from the signal at a level sufficient to power or charge a load; and
means for changing a characteristic of electrical power to improve matching with the receiving means, the means for changing the characteristic comprising means for changing a frequency of a synchronous rectifier.

52. The wireless power receiver as in claim 51, further comprising means for sensing an amount of current that flows through the receiving means and means for changing the characteristic based on the amount of current.

53. A wireless power receiver comprising:
a magnetically resonant antenna;
a receive circuit configured to receive a signal at a frequency that is substantially equal to a resonant frequency of the magnetically resonant antenna, the receive circuit being further configured to generate electrical power from the signal at a level sufficient to power or charge a load;
a power indicator meter; and
a controller configured to change the signal based on an output of the power indicator meter.

\* \* \* \* \*